Figure 2:
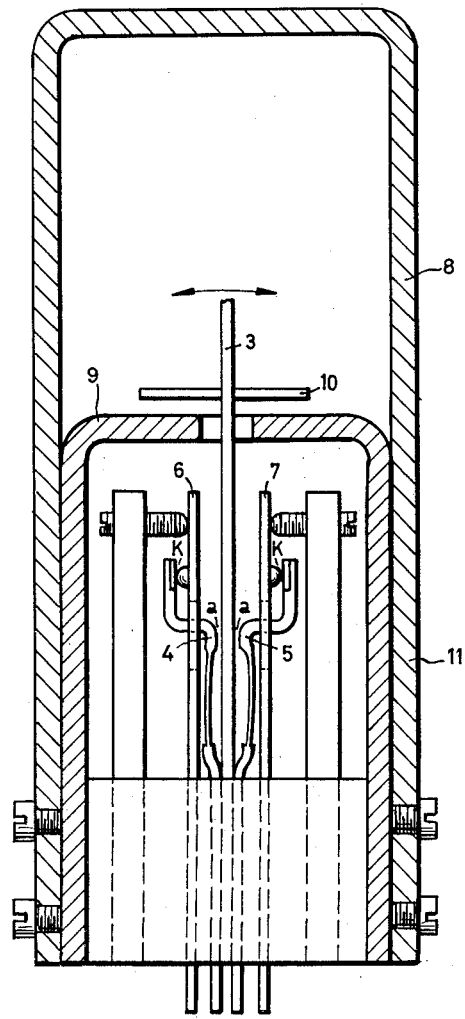

Nov. 13, 1962 W. BOSCH 3,064,096
CONTACT ALTERNATOR
Filed Dec. 10, 1958 2 Sheets-Sheet 1
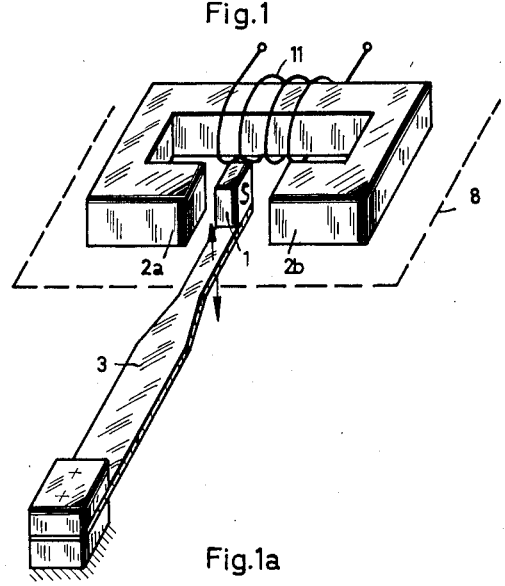
Fig.1
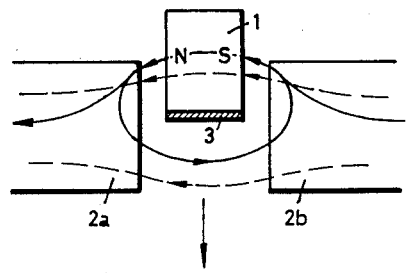
Fig.1a
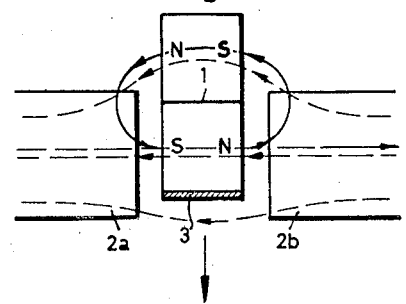
Fig.1b
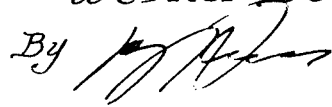
Inventor
Werner Bosch
By
atty Nov. 13, 1962 W. BOSCH 3,064,096
CONTACT ALTERNATOR
Filed Dec. 10, 1958 2 Sheets-Sheet 2

Inventor
Werner Bosch
By [signature]
Atty.

United States Patent Office 3,064,096
Patented Nov. 13, 1962

3,064,096
CONTACT ALTERNATOR
Werner Bosch, Munich, Germany, assignor to Siemens and Halske Aktiengesellschaft Berlin and Munich, a corporation of Germany
Filed Dec. 10, 1958, Ser. No. 779,413
11 Claims. (Cl. 200—90)

This invention is concerned with a contact alternator for use as a measuring chopper to produce controlled current for the input of direct current or alternating current amplifiers.

The purpose of such contact alternator is to chop direct current to be amplified so as to produce an alternating voltage which can be amplified in a succeeding tube amplifier. However, amplifiers employed for this purpose exhibit null point errors, especially in the extremely sensitive measuring ranges, such errors producing at the output of the amplifier a voltage even when the measured value at the input corresponds to a null value. The cause of null point errors of the amplifier is in many cases due to the effect which inductive or capacitive interspersion of the exciter circuit or an exterior field may have on the contact circuit of the chopper. Thermal or contact voltages are often also responsible for these disturbing influences.

The present invention shows a way for eliminating these disturbing influences by the provision, in the drive system, of a permanent magnet which is polarized perpendicularly to the surfaces of the pole pieces of the core of the exciter circuit, such permanent magnet being fastened to a non-magnetic oscillating spring or reed so that it is normally disposed between the pole pieces somewhat off center of the control flux and adapted to move operatively in a direction perpendicular to the direction of the control flux.

The operation of the device according to the invention may be enhanced by the provision of an armature comprising two oppositely polarized individual magnets. Instead of employing two individual magnets, the armature may of course be constructed as a correspondingly polarized twin magnet.

In order to approach as closely as possible the aim of eliminating disturbing voltages, the contact springs which are directly actuated by the oscillating reed are in accordance with a further feature of the invention angularly arcuately shaped, each such contact spring embracing with a rectilinearly extending cooperating spring an area corresponding in size to the area embraced by the other arcuate contact spring with its cooperating rectilinear spring. These surfaces are oriented spatially in such a manner that they become operative in the sense of a compensation of the disturbing voltages interspersed or scattered into the contact circuit. This particular arrangement is of great importance because in case of magnetic interspersion of the exciter circuit and also in the case of external interspersion in the contact circuit, the voltage induced in the latter will be proportional to the area embraced by the contact springs.

In order to maintain the time values at the two pairs of contact springs of the contact alternator as constant as possible, the invention, in accordance with another feature, provides at the operatively effective places of the contact springs which are directly actuated by the oscillating reed a material the wear quality of which corresponds about to that of the contact points, thereby in effect providing in each case two wear areas acting with respect to the time values in opposite sense. The wear at the two involved areas is thereby balanced, the amount of time overlap remaining substantially constant or slowly increasing but at any rate never approaching the null value.

It is despite the good decoupling of the exciter and contact circuits obtained by the invention recommended to obviate residual interspersions or scatterings by providing for both the drive and the contact system a shielding cap of soft iron, especially of Mu-metal. It is moreover advantageous to provide a further shielding member on the oscillating spring so as to shield the opening in the shielding cap of the contact system through which the oscillating reed extends to the drive system. The separately shielded drive and contact systems may be disposed in common in a preferably hermetically sealed housing.

The advantages of the contact alternator according to the invention reside mainly in limiting the permanent flux and the control flux to a small space, thus also facilitating the shielding and obtaining with relatively small overall dimensions good separation of the exciter and contact circuits. The use of a polarized drive system permits moreover application of lower exciter power, thereby also maintaining at a low value the interspersion or scattering energy of the exciter circuit.

The foregoing and further objects and features of the invention will be brought out in the course of the description of an example thereof which will be rendered below with reference to the accompanying drawings. In the drawings, FIG. 1 shows the drive system in schematic representation;

FIGS. 1a and 1b indicate the arrangement of the permanent magnet armature between the pole pieces and the flux distribution which determines the armature motion; and FIG. 2 illustrates partially in sectional view the contact system controlled by the drive system.

In FIG. 1, numeral 1 indicates the permanent magnet positioned at the free end of a non-magnetic leaf spring 3 which constitutes the oscillating reed and which is stationarily fastened at the other end thereof, the permanent magnet 1 being disposed between pole pieces 2a and 2b of the core of the exciter circuit. Numeral 11 in FIG. 1 indicates the exciter coil having terminal means for connecting alternating current thereto to produce a control flux extending across the gap between the pole pieces 2a and 2b. The permanent magnet 1 is polarized perpendicularly to the surfaces of the pole pieces. If the control flux is oriented so that a south pole appears at the pole piece 2a adjacent to the north pole of the permanent magnet 1, the latter will be drawn into the air gap between the pole pieces as shown in FIG. 1a. When a north pole appears at the pole piece 2a, the permanent magnet 1 will be driven away from the air gap. Responsive to an alternating voltage placed on the exciter coil 11 (FIG. 1), the permanent magnet 1 will be caused to oscillate with the exciter frequency and the oscillating reed 3 will thereby actuate the contact system shown in FIG. 2. The permanent magnet is in its resting or normal position disposed somewhat off center of the pole pieces. The material of which the permanent magnet is made is preferably highly coercive iron-barium-oxide. A favorable ratio of length to diameter is, for example, 1:1, and the permanent magnet may accordingly be made very short.

The drive system may be improved by using instead of one single permanent magnet as shown in FIGS. 1 and 1a, two oppositely polarized magnets as shown in FIG. 1b. A single magnet constructed so as to form four poles may be substituted for the two magnets. If the control flux, indicated in FIG. 1b in dotted lines, is directed from right to left, the permanent flux shown in the upper portion of the air gap in full lines, will be strengthened and in the lower portion it will be weakened. The resultant flux and therewith the energy affecting the permanent magnet 1 is accordingly greater in the upper region of the air gap, a component of the energy being directed downwardly and initiating the motion of the permanent magnet and therewith of the oscillating spring 3. The operation is reversed when the oscillating spring reaches its lowermost terminal position. The energy component directed perpendicularly to the direction of motion of the permanent magnet 1 attempts to pull the permanent magnet toward one pole piece, but such force is compensated by a force of similar magnitude exerted by the other pole piece, assuming, of course, that the lateral gaps between the permanent magnet and the pole pieces are of similar size. If these gaps are not of completely equal size, there will of course appear a force acting in a direction perpendicular to the direction of motion of the permanent magnet, but such force will be counteracted and absorbed by the oscillating reed 3 which is in such direction very stiff.

The contact system of the alternator is shown separately in FIG. 2 in which the drive system acting through the medium of the oscillating reed 3 has been omitted to keep the drawing simple. The contact system is constructed so that the individual contacts may be adjusted to function as desired as overlapping contacts and as switch-over contacts. The contact force is independent of the amplitude of the oscillating reed, being solely determined by the tensioning of the contact springs 4 and 5. The right hand contacts K are opened responsive to deflection of the oscillating reed 3 to the right and closed again due to the tensioning of the spring 5 when the oscillating reed 3 moves to the left. The normal contact pressure is determined by adjustment of the spring 7. The operation is similar with regard to the left hand contacts responsive to motion of the oscillating reed 3 to the left, the normal contact pressure being determined by adjustment of the spring 6.

The contact springs 4 and 5 are generally S-shaped in order to compensate to a far reaching extent voltages induced in the contact circuit by disturbing fields. Two closed areas are in this manner provided which are oppositely oriented so that voltage induced in the contact system is cancelled.

The contact system also permits maintaining constant time values. It is by suitable matching of the materials at the drive points *a* with the materials of the contact points at K possible to obtain equalized or balanced wear at the corresponding areas thereby providing sufficiently stable characteristics for operation over extended periods of time.

The drive system (FIG. 1) is provided with a shielding cap diagrammatically indicated at 8 and the contact system (FIG. 2) is similarly provided with a shielding cap 9, such caps being made of soft iron, preferably of Mu-metal. The oscillating spring 3 extends from the contact system through an opening in the shielding cap 9 to the drive system, such opening being shielded by a further shielding member 10 carried by the oscillating spring 3. As illustrated in FIG. 2, the cap 8 may be extended as indicated at 11 to enclose the cap 9 and suitably hermetically sealed.

Changes may be made within the scope and spirit of the appended claims in which is defined what is believed to be new and desired to have protected by Letters Patent.

I claim:

1. A contact alternator for use in connection with the input of an amplifier, said alternator having an electromagnetic vibratory motor comprising an electromagnet having a soft iron core provided with an exciter winding and forming oppositely disposed pole pieces separated by an air gap, means for connecting to said exciter winding an alternating voltage so as to produce a control flux flowing across said air gap, a non-magnetic oscillating spring stationarily mounted at one end remote from said air gap, the free end of said oscillating spring extending into the area defined by said air gap, permanent magnet means carried by said free end of said oscillating spring and normally positioned in part in said air gap somewhat off center of the control flux flowing thereacross responsive to the action of the alternating voltage connected to said exciter winding, said permanent magnet means being polarized in the direction of said control flux and vibrating responsive to the action thereof in a direction perpendicular to the direction of the control flux and thereby imparting corresponding vibratory motion to said oscillating spring for the actuation of contact means controlled thereby.

2. A structure according to claim 1, comprising two oppositely polarized individual permanent magnets constituting said permanent magnet means.

3. A structure according to claim 1, comprising a unitary body having oppositely polarized ends and constituting said permanent magnet means.

4. A structure according to claim 1, comprising shielding means made of soft iron of the class of Mu-metal and surrounding said vibratory motor, said oscillating spring extending through an opening formed in said shielding means.

5. A structure according to claim 1, comprising shielding means made of soft iron of the class of Mu-metal and surrounding said vibratory motor, said oscillating spring extending through an opening formed in said shielding means, and further shielding means carried by said oscillating spring for vibratory motion therewith.

6. A structure according to claim 1, wherein said contact means comprises angularly extending arcuately shaped contact springs operatively directly controlled by said oscillating spring, a rectilinear contact spring cooperating with each angularly extending arcuately shaped contact spring and embracing therewith an area corresponding to the area embraced by the other similarly shaped contact spring with its respectively cooperating rectilinear contact spring, said areas being oriented so as to become effective for compensating disturbing voltages interspersed in a circuit in which said contact springs may be operatively disposed.

7. A structure according to claim 6, comprising a common hermetically sealed housing for said vibratory motor and said contact means, and means in said housing for separately shielding said systems.

8. A structure according to claim 6, comprising means forming for each angularly extending arcuately shaped contact spring and cooperating rectilinear contact spring two operatively oppositely effective areas of wear.

9. A structure according to claim 8, comprising contact material carried by said angularly extending arcuately shaped contact springs at the point of contact with said oscillating spring which corresponds in respect to wear to the material of the contact point carried thereby and cooperating with contact means carried by the respective rectilinear contact spring.

10. A structure according to claim 6, comprising shielding means for said vibratory motor and for said contact means made of soft iron of the class of Mu-metal.

11. A structure according to claim 10, wherein an opening is formed in the shielding means for said contact means, said oscillating spring extending through said opening to said vibratory motor, and means carried by said oscillating spring for shielding said opening.

References Cited in the file of this patent

UNITED STATES PATENTS

| | | |
|---|---|---|
| 2,434,671 | Murphy | Jan. 20, 1948 |
| 2,614,188 | Williams et al. | Oct. 14, 1952 |
| 2,623,965 | Clark | Dec. 30, 1952 |
| 2,902,561 | Umrath | Sept. 1, 1959 |
| 2,937,250 | Onsken et al. | May 17, 1960 |